United States Patent
Luo et al.

(10) Patent No.: US 11,411,892 B2
(45) Date of Patent: Aug. 9, 2022

(54) PACKET FRAGMENT PROCESSING METHOD AND APPARATUS AND SYSTEM

(71) Applicant: HUAWEI TECHNOLOGIES CO., LTD., Shenzhen (CN)

(72) Inventors: Jun Luo, Dongguan (CN); Junpeng Lei, Dongguan (CN); Zongwu Qu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/027,722

(22) Filed: Sep. 22, 2020

(65) Prior Publication Data

US 2021/0014179 A1 Jan. 14, 2021

Related U.S. Application Data (63) Continuation of application No. PCT/CN2018/080054, filed on Mar. 22, 2018.

(51) Int. Cl.
| | |
|---|---|
| *H04L 49/9057* | (2022.01) |
| *H04L 47/34* | (2022.01) |
| *H04L 49/90* | (2022.01) |
| *H04L 12/28* | (2006.01) |
| *H04L 47/36* | (2022.01) |

(52) U.S. Cl.
CPC ........ *H04L 49/9057* (2013.01); *H04L 47/34* (2013.01); *H04L 49/9084* (2013.01); *H04L 12/2861* (2013.01); *H04L 47/36* (2013.01)

(58) Field of Classification Search
CPC ... H04L 49/068; H04L 47/30; H04L 49/3009; H04L 49/901; H04L 69/22; H04L 49/9057; H04L 47/34; H04L 49/9084; H04L 12/2861; H04L 47/36; H04L 69/166

See application file for complete search history.

(56) References Cited

U.S. PATENT DOCUMENTS

| | | | |
|---|---|---|---|
| 8,255,567 B2 | 8/2012 | Mizrachi et al. | |
| 9,998,434 B2 * | 6/2018 | Verzun | G06F 21/606 |
| 2013/0322465 A1 * | 12/2013 | Way | H04L 47/36 370/474 |
| 2013/0336320 A1 | 12/2013 | Rangaraman | |

(Continued)

FOREIGN PATENT DOCUMENTS

| | | |
|---|---|---|
| CN | 1592215 A | 3/2005 |
| CN | 1863141 A | 11/2006 |

(Continued)

OTHER PUBLICATIONS

Chinese Office Action issued in corresponding Chinese Application No. 201880091631.5, dated Mar. 23, 2021, pp. 1-6.

(Continued)

*Primary Examiner* — Kibrom T Hailu
(74) *Attorney, Agent, or Firm* — Hauptman Ham, LLP (57) ABSTRACT

This application provides a packet fragment processing method and apparatus and a system, to reduce occupancy of a storage resource of a network device. The method includes: receiving, by a network device, a first packet fragment set from first user equipment, where the first packet fragment set includes a plurality of packet fragments; and sending, by the network device, the first packet fragment set to a server.

17 Claims, 6 Drawing Sheets

(56) References Cited

U.S. PATENT DOCUMENTS

2014/0047188 A1   2/2014   Xia
2016/0050140 A1   2/2016   Chinni et al.

FOREIGN PATENT DOCUMENTS

| | | |
|---|---|---|
| CN | 101022411 A | 8/2007 |
| CN | 101159694 A | 4/2008 |
| CN | 101488912 A | 7/2009 |
| CN | 101640645 A | 2/2010 |
| CN | 101841463 A | 9/2010 |
| CN | 102123090 A | 7/2011 |
| CN | 102377640 A | 3/2012 |
| CN | 102624744 A | 8/2012 |
| CN | 102647353 A | 8/2012 |
| CN | 106713187 A | 5/2017 |
| CN | 107210966 A | 9/2017 |
| EP | 1109373 A2 | 6/2001 |
| EP | 2670098 A1 | 12/2013 |

OTHER PUBLICATIONS

Chinese Search Report issued in corresponding Chinese Application No. 201880091631.5, dated Mar. 15, 2021, pp. 1-3.

European Search Report issued in corresponding European Application No. 18910694.1, dated Feb. 3, 2021, pp. 1-10, European Patent Office, Munich, Germany.

IEEE Draft P802.11-REVmb /D12, Nov. 2011, total 2910 pages.

Data Over Cable Service Interface Specifications, DOCSIS 3.0, "Physical Layer Specification", CM-SP-PHYv3.0-I11-130808, Aug. 8, 2013, total 200 pages.

Data-Over-Cable Service Interface Specifications, DOCSIS 3.1, "Physical Layer Specification", CM-SP-PHYv3.1-I02-140320, Mar. 20, 2014, total 236 pages.

Liu Yan et al.,"Test and Analysis of the Implementation ofCache Used in IP Fragments Reassembly", Computer Engineering and Applications, 176-178,200, Issue 36, 2003, total 4 pages. With an English Abstract.

* cited by examiner

FIG. 11

PACKET FRAGMENT PROCESSING METHOD AND APPARATUS AND SYSTEM

CROSS-REFERENCE TO RELATED APPLICATIONS

This application is a continuation application of Patent Application No. PCT/CN2018/080054, filed on Mar. 22, 2018. The disclosures of the aforementioned application is hereby incorporated by reference in its entirety.

TECHNICAL FIELD

This application relates to the communications field, and in particular, to a packet fragment processing method and apparatus and a system.

BACKGROUND

A point-to-multipoint (P2MP) network is a communications network. A typical P2MP network may be applied to a passive optical network (PON) or a cable TV network. A P2MP network generally includes one network device and a plurality of user equipments. In an uplink direction, to avoid a conflict and increase efficiency, the user equipments generally communicate by using a multi-user access protocol. The foregoing multi-user access protocol may be a time division multiple access (TDMA) protocol or a code division multiple access (CDMA) protocol. In the multi-user access protocol, each user equipment may slice a packet into a plurality of packet fragments and send the plurality of packet fragments, and the network device reassembles the plurality of packet fragments from the user equipment into the packet. In the foregoing technical solution, a relatively large quantity of storage resources of the network device are occupied. For example, in the TDMA protocol, the user equipment sends a packet fragment in a timeslot allocated to the user equipment. When reassembling a plurality of packet fragments, the network device needs to store the plurality of packet fragments by using a memory included in the network device. In the foregoing technical solution, a relatively large quantity of storage resources of the network device are occupied.

SUMMARY

This application provides a packet fragment processing method and apparatus and a system, to reduce occupancy of a storage resource of a network device.

According to a first aspect, a packet fragment processing method is provided, including: receiving, by a network device, a first packet fragment set from first user equipment, where the first packet fragment set includes a plurality of packet fragments; and sending, by the network device, the first packet fragment set to a server, so that the server reassembles the first packet fragment set, to generate a first packet, where the first packet includes the first packet fragment set.

In this embodiment of this application, the network device may send the first packet fragment set to the server, and the server reassembles the first packet fragment set. In the foregoing technical solution, when the first packet fragment set is reassembled, a storage resource of the network device does not need to be occupied. Therefore, occupancy of a storage resource of the network device is reduced.

In a possible implementation, a length of the first packet is greater than a maximum transmission unit (MTU) allocated to the first user equipment.

In a possible implementation, the length of the first packet is greater than a data length corresponding to a timeslot allocated to the first user equipment.

In a possible implementation, the data length corresponding to the timeslot is a product of a data transmission rate of a link between the network device and the first user equipment and a length of the timeslot.

In a possible implementation, the network device receives a second packet fragment set from second user equipment, where the second packet fragment set includes a plurality of packet fragments; the network device stores the second packet fragment set in an on-chip memory, and the on-chip memory and a processor of the network device are disposed on a same chip; and the network device reassembles the second packet fragment set stored in the on-chip memory, to generate a second packet, where the second packet includes the second packet fragment set.

In this embodiment of this application, a storage resource in the on-chip memory or the server may be allocated to a to-be-reassembled packet fragment set, to improve flexibility of packet fragment reassembly. Further, when a storage resource is available in the on-chip memory, packet reassembly may be preferentially completed locally, and a delay of packet fragment reassembly can be reduced.

In a possible implementation, the method further includes: receiving, by the network device, a third packet fragment set from the first user equipment, where the third packet fragment set includes a plurality of packet fragments; receiving, by the network device, a fourth packet fragment set from the first user equipment, where the fourth packet fragment set includes a plurality of packet fragments; sending, by the network device, the fourth packet fragment set to the server, where the fourth packet fragment set is a packet fragment set preceding the third packet fragment set; and when the network device determines that the server has reassembled the fourth packet fragment set to generate a fourth packet, reassembling, by the network device, the third packet fragment set, to generate a third packet, where the third packet includes the third packet fragment set, and the fourth packet includes the fourth packet fragment set.

In this embodiment of this application, after determining that the server completes processing all packet fragment sets from the first user equipment, the network device switches to locally reassemble a subsequent packet fragment set from the first user equipment, to ensure that no disorder occurs in a process of packet fragment reassembly.

In a possible implementation, before the sending, by the network device, the first packet fragment set to a server, the method further induces: determining, by the network device, that no storage resource is available in the on-chip memory.

In this embodiment of this application, when no storage resource is available in the on-chip memory, the network device sends the first packet fragment set to the server, and the server reassembles the first packet fragment set, to ensure efficiency of packet reassembly in an extreme case.

In a possible implementation, that the network device determines that the server has reassembled the fourth packet fragment set to generate a fourth packet includes: receiving, by the network device from the server, first information used to indicate the fourth packet; and determining, by the network device based on the first information, that the server has reassembled the fourth packet fragment set to generate the fourth packet.

In a possible implementation, after the sending, by the network device, the fourth packet fragment set to the server, the method further includes: storing, by the network device, an identifier of the fourth packet corresponding to the fourth packet fragment set; and the determining, by the network device based on the first information, that the server has reassembled the fourth packet fragment set to generate the fourth packet includes: determining, by the network device based on the stored identifier of the fourth packet and the first information, that the server has reassembled the fourth packet fragment set to generate the fourth packet.

In a possible implementation, the method further includes: sending, by the network device, second information to the server, where the second information is used to request the server to allocate a storage resource that is used to reassemble a packet fragment set from the first user equipment into a packet.

In a possible implementation, the method further includes: sending, by the network device, third information to the server, where the third information is used to instruct the server to release a storage resource that is used to reassemble a packet fragment set from the first user equipment into a packet.

According to a second aspect, a packet fragment processing method is provided, including: receiving, by a server, a first packet fragment set from a network device, where the first packet fragment set includes a plurality of packet fragments, and the first packet fragment set is from first user equipment; and reassembling, by the server, the first packet fragment set, to generate a first packet, where the first packet includes the first packet fragment set.

In this embodiment of this application, the server receives the first packet fragment set sent by the network device, and reassembles the first packet fragment set. In the foregoing technical solution, the first packet fragment set is reassembled by the server, and a storage resource of the network device does not need to be occupied, thereby reducing occupancy of a storage resource of the network device.

In a possible implementation, the method further includes: sending, by the server, first information to the network device, where the first information is used to indicate the first packet.

In a possible implementation, the method further includes: receiving, by the server, second information sent by the network device, where the second information is used to request the server to allocate a storage resource that is used to reassemble a packet fragment set from the first user equipment into a packet; and allocating, by the server based on the second information, the storage resource that is used to reassemble the packet fragment set from the first user equipment into the packet.

In a possible implementation, the method further includes: receiving, by the server, third information sent by the network device, where the third information is used to instruct to release the storage resource that is allocated by the server and that is used to reassemble the packet fragment set from the first user equipment into the packet; and releasing, by the server based on the third information, the storage resource that is used to reassemble the packet fragment set from the first user equipment into the packet.

According to a third aspect, a packet fragment processing apparatus is provided, and the apparatus is configured to perform the method that is implemented by the network device in any one of the first aspect or the possible implementations of the first aspect. Specifically, the apparatus includes a unit configured to perform the method in any one of the first aspect or the possible implementations of the first aspect.

According to a fourth aspect, a packet fragment processing apparatus is provided, and the apparatus is configured to perform the method that is implemented by the server in any one of the second aspect or the possible implementations of the second aspect. Specifically, the apparatus includes a unit configured to perform the method in any one of the second aspect or the possible implementations of the second aspect.

According to a fifth aspect, a packet fragment processing apparatus is provided, and the apparatus includes a communications interface. The communications interface is configured to receive a first packet fragment set from first user equipment, where the first packet fragment set includes a plurality of packet fragments; and the communications interface is further configured to send the first packet fragment set to a server.

In a possible implementation, a length of the first packet is greater than a maximum transmission unit (MTU) allocated to the first user equipment.

In a possible implementation, the length of the first packet is greater than a data length corresponding to a timeslot allocated to the first user equipment.

In a possible implementation, the data length corresponding to the timeslot is a product of a data transmission rate of a link between a network device and the first user equipment and a length of the timeslot.

In a possible implementation, the apparatus further includes a processor and an on-chip memory, and the on-chip memory and the processor are disposed on a same chip; the communications interface is further configured to receive a second packet fragment set from second user equipment, where the second packet fragment set includes a plurality of packet fragments; the processor is configured to store the second packet fragment set in the on-chip memory; and the processor is further configured to reassemble the second packet fragment set stored in the on-chip memory, to generate a second packet, where the second packet includes the second packet fragment set.

In a possible implementation, the communications interface is further configured to receive a third packet fragment set from the first user equipment, where the third packet fragment set includes a plurality of packet fragments; the communications interface is further configured to receive a fourth packet fragment set from the first user equipment, where the fourth packet fragment set includes a plurality of packet fragments; the communications interface is further configured to send the fourth packet fragment set to the server, where the fourth packet fragment set is a packet fragment set preceding the third packet fragment set; and when the processor determines that the server has reassembled the fourth packet fragment set to generate a fourth packet, the processor is configured to reassemble the third packet fragment set, to generate a third packet, where the third packet includes the third packet fragment set, and the fourth packet includes the fourth packet fragment set.

In a possible implementation, before the communications interface sends the first packet fragment set to a server, the processor is configured to determine that no storage resource is available in the on-chip memory.

In a possible implementation, the communications interface is further configured to receive, from the server, first information used to indicate the fourth packet; and when determining the server has reassembled the fourth packet fragment set to generate a fourth packet, the processor is specifically configured to determine, based on the first information, that the server has reassembled the fourth packet fragment set to generate the fourth packet.

In a possible implementation, the apparatus further includes a memory; after the communications interface sends the fourth packet fragment set to the server, the memory is further configured to store an identifier of the fourth packet corresponding to the fourth packet fragment set; and the processor is specifically configured to determine, based on the stored identifier of the fourth packet and the first information, that the server has reassembled the fourth packet fragment set to generate the fourth packet.

Optionally, the memory may be the on-chip memory, or may be an off-chip memory.

According to a sixth aspect, a packet fragment processing apparatus is provided, and the apparatus includes a processor and a communications interface. The communications interface is configured to receive a first packet fragment set from a network device, where the first packet fragment set includes a plurality of packet fragments, and the first packet fragment set is from first user equipment; and the processor is configured to reassemble the first packet fragment set, to generate a first packet, where the first packet includes the first packet fragment set.

According to a seventh aspect, a communications system is provided, and the system includes the apparatus described in the third aspect and the apparatus described in the fourth aspect, or includes the apparatus described in the fifth aspect and the apparatus described in the sixth aspect.

According to an eighth aspect, a computer readable medium is provided, configured to store a computer program, where the computer program includes an instruction used to perform the method in any one of the first aspect or the possible implementations of the first aspect.

According to a ninth aspect, a computer readable medium is provided, configured to store a computer program, where the computer program includes an instruction used to perform the method in any one of the second aspect or the possible implementations of the second aspect.

According to a tenth aspect, a computer program product including an instruction is provided. When the computer program product is run on a computer, the computer is enabled to execute the instruction used to perform the method in any one of the first aspect or the possible implementations of the first aspect.

According to an eleventh aspect, a computer program product including an instruction is provided. When the computer program product is run on a computer, the computer is enabled to execute the instruction used to perform the method in any one of the second aspect or the possible implementations of the second aspect.

DETAILED DESCRIPTION OF EMBODIMENTS

The following describes the technical solutions of this application with reference to the accompanying drawings.

The packet fragment processing method and apparatus and the system in this application may be applied to a network. For example, the network may be a P2MP network. The following describes the technical solutions of this application by using an example with reference to a P2MP network.

A P2MP network generally includes a network device and a plurality of user equipments. The network device and the user equipments are in a point-to-multipoint connection manner. P2MP networks are widely used in various communications systems. For example, the P2MP network may be used in a wired communications system or a wireless communications system. The wired communications system may be a PON or a cable TV network. The wireless communications system may be a global system for mobile communications (GSM) system, a general packet radio service (GPRS) system, a universal mobile telecommunications system (UMTS), a worldwide interoperability for microwave access (WiMAX) communications system, or a 5th generation (5G) system, a new radio (NR) system, or the like in future.

Figure 1:
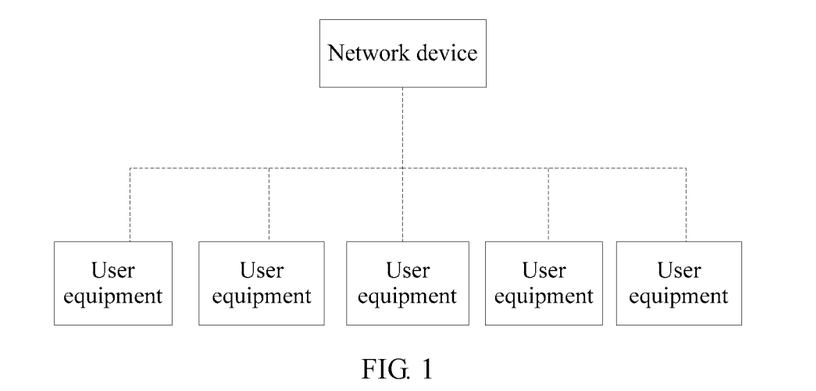
FIG. 1 is a schematic diagram of a P2MP network according to an embodiment of this application.

FIG. 1 is a schematic diagram of a P2MP network according to an embodiment of this application. As shown in FIG. 1, the P2MP network includes a network device and a plurality of user equipments. The network device communicates with the user equipment in a wired or wireless manner. For example, in a cellular wireless communications system, the foregoing network device may be a base station, and the foregoing user equipment may be a mobile terminal. For another example, in a wireless local area network (WLAN), the foregoing network device may be an access point (AP), and the foregoing user equipment may be a station (STA). In a wired communications network, the foregoing network device may be referred to as a head-end device or a central office device. The network device may be configured to aggregate and manage data sent by the user equipment. For example, the network device may be an optical line terminal (OLT) in a PON or a cable modem termination system (CMTS) in a cable TV network. In the wired communications network, the foregoing user equipment may be a wired access terminal, and the wired access terminal may be connected to at least one customer premise equipment (CPE), to implement network access of the customer premise equipment. For example, the foregoing wired access terminal may be an optical network unit (ONU) in a PON or a cable modem (CM) in a cable TV network. The foregoing customer premise equipment may be a personal computer (PC), an integrated access device (IAD), a workstation, or a network computer.

Figure 2:
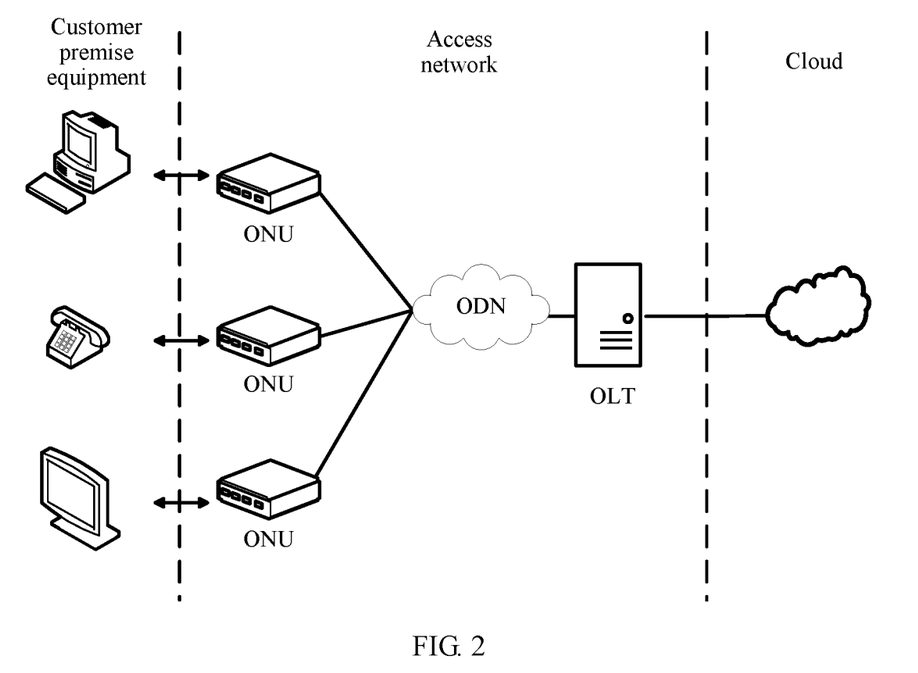
FIG. 2 is a schematic diagram of a scenario of a PON according to an embodiment of this application.
Figure 3:
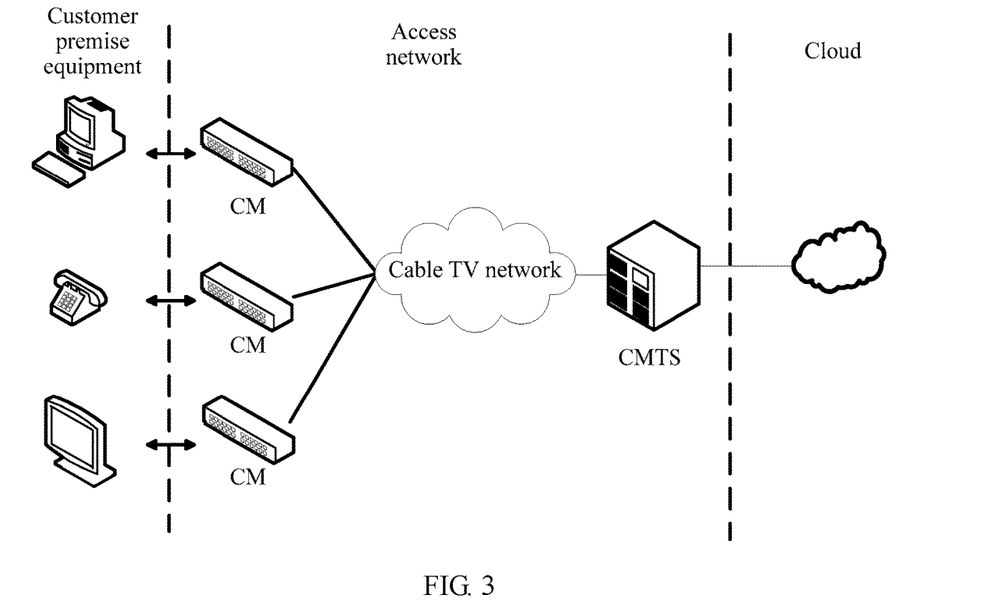
FIG. 3 is a schematic diagram of a scenario of a cable TV network according to an embodiment of this application.

A typical P2MP network in a wired communications system is described below with reference to FIG. 2 and FIG. 3. It should be noted that FIG. 2 and FIG. 3 are merely example descriptions of an application scenario of this application. The packet fragment processing method in this application may be further applied to another variant of a scenario shown in FIG. 2 or FIG. 3 or any other type of P2MP network.

FIG. 2 is a schematic diagram of a scenario of a PON according to this application. The network device in FIG. 1 may be specifically an OLT in FIG. 2, and the user equipment in FIG. 1 may be specifically an ONU in FIG. 2. The ONU may be disposed near a customer premise equipment, and be connected to the customer premise equipment, to provide a network access technology for the customer premise equipment. The OLT is disposed near a cloud, and is connected to the cloud. The cloud may refer to a network in general. For example, the cloud may be an operation center communicating with a plurality of computers by using a network, or a service that is obtained by accessing a network and that is provided by a remote host. The cloud may include a core network, a metropolitan area network, a wide area network, and the like. Alternatively, the cloud may be a data center. The technical solutions provided in this application are described by using examples in FIG. 6 to FIG. 7.

The OLT may be configured to aggregate and manage data sent by an ONU. A link between the OLT and an ONU may be referred to as an optical distribution network (optical distribution network, ODN). The link includes an optical fiber, and further includes a passive optical splitter or a coupler.

FIG. 3 is a schematic diagram of a cable TV network according to this application. The network device in FIG. 1 may be specifically a CMTS in FIG. 3. The user equipment in FIG. 1 may be a CM in FIG. 3. The cable TV network uses a point-to-multipoint tree-like network architecture, and the cable TV network may be based on a hybrid fiber coaxial (HFC) access technology. Specifically, the cable TV network may provide data transmission between the CMTS and a CM. The CMTS may be referred to as a head-end device or a central office device, and the CMTS is configured to aggregate and manage data sent by a CM. The CMTS is generally disposed between the cable TV network and a cloud. A CM may be referred to as a terminal device, and a CM is generally disposed near a customer premise equipment, and is connected to the customer premise equipment, to provide a network access function for the customer premise equipment. To be specific, the customer premise equipment is connected to the cable TV network by using a CM. The CMTS may receive a packet fragment from a CM by using the cable TV network, and after reassembling the packet fragment, continue uplink transmission. The uplink transmission may be a process in which the customer premise equipment transmits data to the cloud.

Figure 4:
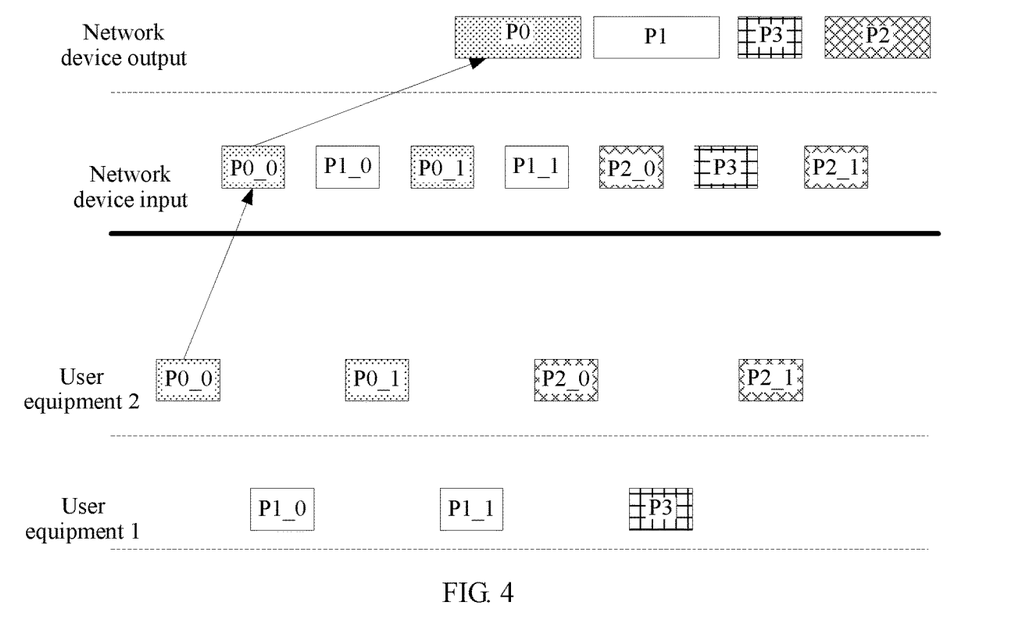
FIG. 4 is a schematic diagram of packet fragment reassembly in the related art.

FIG. 4 is a schematic diagram of packet fragment reassembly in the related art. A method in FIG. 4 may be applied to any scenario in FIG. 1 to FIG. 3. As described above, a multi-user access protocol is used in a P2MP network. To be specific, a plurality of user equipments share a channel resource to transmit data. The foregoing multi-user access protocol may include, for example, a TDMA protocol and a CDMA protocol. In uplink transmission in the multi-user access protocol, user equipment sends a packet fragment to a network device, and the network device reassembles the packet fragment. For example, in a TDMA protocol, a timeslot is allocated to each user equipment to transmit data. When a length of a packet to be sent by the user equipment does not match the timeslot, the user equipment needs to slice the to-be-sent packet before sending the packet fragment to the network device. That the length of the packet does not match the timeslot may mean that the length of the packet is greater than a data length corresponding to the timeslot allocated to the user equipment. The data length corresponding to the timeslot is a size of the data transmitted in the timeslot. For example, the data length corresponding to the timeslot may be a product of a data transmission rate of a link between the network device and first user equipment and a length of the timeslot. In an example, it is assumed that the foregoing data transmission rate is 50 megabits/second (Mbps), and a length of one timeslot is 10 microseconds (μs). The data length corresponding to the timeslot is 50 Mbps×10 μs=500 bits (bit). After receiving a plurality of packet fragments sent by a same user equipment, the network device reassembles the packet fragments, to obtain a reassembled packet, and performs uplink transmission on the reassembled packet. For example, as shown in FIG. 4, user equipment 1 slices a packet P0 into a packet fragment P0_0 and a packet fragment P0_1, and slices a packet P2 into a packet fragment P2_0 and a packet fragment P2_1. User equipment 2 slices a packet P1 into a packet fragment P1_0 and P1_1. A length of a packet P3 matches the timeslot. Therefore, the packet P3 may be sent to the network device without being sliced. In this application, that a length of a packet matches a timeslot may include that a length of a packet sent by user equipment is less than or equal to the data length corresponding to the timeslot allocated to the user equipment.

After receiving the foregoing packet fragments, the network device reassembles the foregoing packet fragments, to obtain the reassembled packet, and performs uplink transmission on the reassembled packet. For example, the network device reassembles the packet fragment P0_0 and the packet fragment P0_1, to obtain the reassembled packet P0, reassembles the packet fragment P1_0 and the packet fragment P1_1, to obtain the reassembled packet P1, and reassembles the packet fragment P2_0 and the packet fragment P2_1, to obtain the reassembled packet P2. The user equipment 1 and the user equipment 2 may be different ONUs in FIG. 2. Alternatively, the user equipment 1 and the user equipment 2 may be different CMs in FIG. 3.

Optionally, packets used in this embodiment of this application may be packets in a plurality of protocols. For example, the foregoing packet may be a packet in the Ethernet, for example, an Ethernet frame. The foregoing packet may alternatively be an Internet Protocol (IP) packet. The user equipment may sequentially send packet fragments to the network device in a sequence. In other words, a sending sequence of the packet fragments is sequence-preserving. The network device may sequentially reassemble the packet fragments in a sequence of the received packet fragments, to obtain a reassembled packet. In addition, a packet fragment may further include a header flag and/or a tail flag. For example, the header flag is used to indicate that the packet fragment belongs to a first packet fragment of a to-be-reassembled packet, and the tail flag is used to indicate that the packet fragment belongs to a last packet fragment of the to-be-reassembled packet. The network device may further allocate a sequence number to a packet fragment from a same user equipment based on a receiving sequence. The sequence number may be used to indicate a packet to which the packet fragment belongs.

Further, the sequence number may indicate a location that is of the packet and that is in a plurality of packets sent by a same user equipment. A location that is of a packet sent at an earlier time and that is in the plurality of packets is in front of a location that is of a packet sent at a later time and that is in the plurality of packets. For example, in FIG. 4, sequence numbers of the packet fragment P0_1 and the packet fragment P0_1 that are sent by the user equipment 1 are the same, and may be set to 1; and in FIG. 4, sequence numbers of the packet fragment P2_0 and the packet fragment P2_1 that are sent by the user equipment 1 are the same, and may be set to 2. The foregoing sequence numbers indicate that a sending time of the packet P0 is earlier than that of the packet P2. It should be noted that the foregoing manner of allocating a sequence number is only an example. In this embodiment of this application, another manner of allocating a sequence number may alternatively be used, provided that the sequence number may indicate a sending sequence of a packet to which a packet fragment belongs. Optionally, a packet generally includes a data part and a control part. The control part is generally referred to as a packet header, and the control part is used to carry control information related to the packet. Correspondingly, a packet fragment may also include a data part and a control part, and the foregoing control part may be referred to as a header of the packet fragment. The header of the packet fragment may carry the foregoing header flag, the foregoing tail flag, or the foregoing sequence number.

Figure 5:
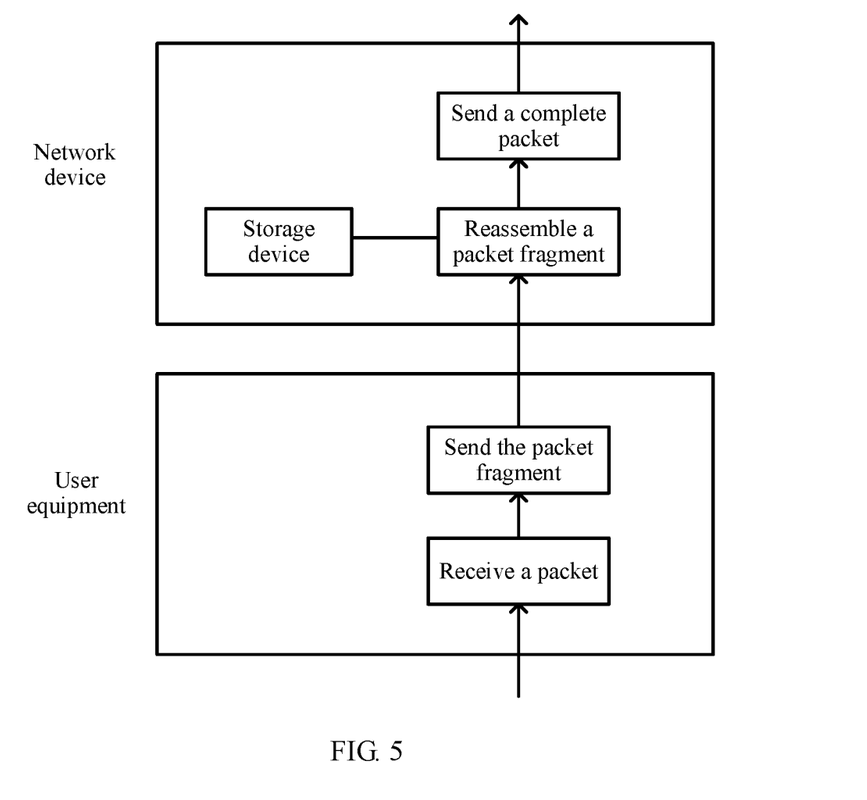
FIG. 5 is a schematic flowchart of a packet fragment processing method in the related art.

FIG. 5 is a schematic flowchart of a packet fragment processing method in the related art. A network device receives a plurality of packet fragments from user equipment, and reassembles the packet fragments, to obtain a reassembled packet. The network device buffers the packet fragment by using a local storage resource. When there is a relatively large quantity of user equipments, a relatively large quantity of storage resources need to be occupied. Because storage space of an on-chip memory is limited, the foregoing local storage resource is generally an off-chip memory. For example, the off-chip memory may be a double data rate synchronous dynamic random access memory (DDR SDRAM).

In the packet fragment processing method shown in FIG. 5, a relatively large quantity of storage resources of the network device are occupied. Especially, when there is a relatively large quantity of currently active users, the network device needs to occupy a large quantity of storage resources to buffer to-be-reassembled packet fragments.

Based on the foregoing problem, this application provides a packet fragment processing method and apparatus and a system. In the foregoing technical solution, packet fragment reassembly is performed by using a storage resource in a server. The foregoing server may be connected to the network device. For example, a plurality of network devices may be connected to a same server, and the same server separately reassembles packet fragments from different network devices, to increase utilization of a storage resource. For another example, the foregoing server may be a cloud server. A cloud may be a data center. The cloud server may be a server located in the data center. The cloud server may be a resource pool including a plurality of servers. A user does not need to purchase hardware in advance, and a resource provided by the cloud server may be flexibly extended. For example, any quantity of cloud servers may be quickly created or released based on a requirement of the user. If a plurality of network devices are connected to a cloud server, and the cloud server reassembles packet fragments from different network devices, the different network devices may be connected to different servers at a hardware level, or may be connected to a same server. The technical solutions provided in this application are subsequently described by using an example with reference to FIG. 6 to FIG. 7.

Figure 6:
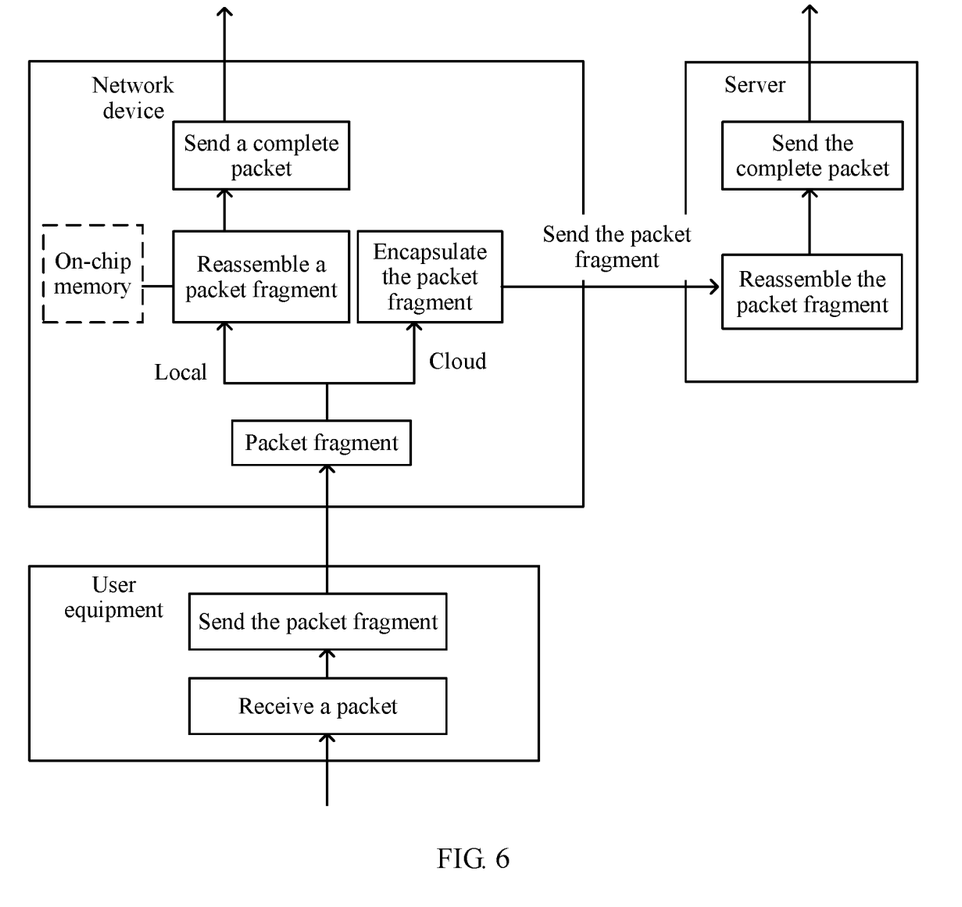
FIG. 6 is a schematic diagram of a scenario of packet fragment processing according to an embodiment of this application.

FIG. 6 is a schematic diagram of a scenario of packet fragment processing according to an embodiment of this application. User equipment in FIG. 6 may be an ONU in FIG. 2. A network device in FIG. 6 may be the OLT in FIG. 2. Alternatively, user equipment in FIG. 6 may be a CM in FIG. 3, and a network device in FIG. 6 may be the CMTS in FIG. 3. As shown in FIG. 6, after receiving a packet fragment, the network device may send the packet fragment to a server, and the server reassembles the packet fragment. The foregoing server may be connected to the network device, for example, a cloud server. After obtaining a reassembled packet, the server may continue to perform uplink transmission on the packet. For example, the reassembled packet includes a source destination address of the packet, and the server may send the packet to a corresponding destination address based on the source destination address.

Optionally, in some embodiments, a storage resource located locally and a storage resource located in the server may also be selected and used to collaboratively perform packet fragment reassembly. The foregoing local storage resource may be located in an on-chip memory. For example, the foregoing on-chip memory may be a random access memory (RAM). In this embodiment of this application, the on-chip memory and a processor of the network device may be located in a same chip. The processor may be a processing circuit used for packet reassembly. For example, the processor may be a media access control (MAC) chip. Compared with an off-chip memory, the on-chip memory has a higher operating frequency, and therefore, a speed of packet fragment reassembly can be increased. In addition, the on-chip memory is relatively close to the processor. Therefore, a speed of reading data from the on-chip memory by the processor is higher, and a speed of packet fragment reassembly can be increased by using this feature. However, storage space of the on-chip memory is limited. When there is a relatively large quantity of currently active users, the on-chip memory cannot provide enough buffer space. Therefore, when a storage resource is available in the on-chip memory, the on-chip memory may be used to store a packet fragment, and perform packet fragment reassembly. When no storage resource is available in the on-chip memory, the packet fragment may be sent to the server, and the server reassembles the packet fragment. In some embodiments, the network device may further establish a communication mechanism with the server, to allocate a storage resource that is located locally and a storage resource that is located in the server.

Figure 7:
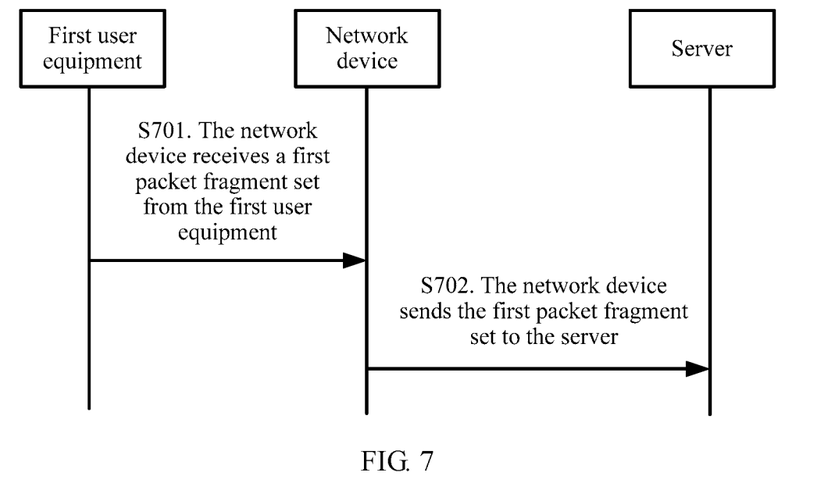
FIG. 7 is a schematic flowchart of packet fragment processing according to an embodiment of this application.

FIG. 7 is a schematic flowchart of packet fragment processing according to an embodiment of this application. A method may be performed by a network device, user equipment, and a server. First user equipment and a network device in FIG. 7 may be an ONU and the OLT in FIG. 2 respectively. Alternatively, first user equipment and a network device in FIG. 7 may be a CM and the CMTS in FIG. 3 respectively. Alternatively, first user equipment, a network device, and a server in FIG. 7 may be the user equipment, the network device, and the server in FIG. 6 respectively. In addition, the network device and the first user equipment may be a base station and a mobile terminal respectively. For example, the base station may be an eNodeB. The mobile terminal may be user equipment (UE) that supports long term evolution (LTE). The LTE may be frequency division duplex (FDD) LTE or time division duplex (TDD) LTE. The UE may be a cellular phone. For LTE and the UE, refer to a standard released by the 3rd Generation Partnership Project (3GPP). In addition, the network device and the first user equipment may be an access point (AP) and a terminal respectively. The terminal and the AP are located in a wireless local area network. The terminal may access the Internet by using the AP. For example, the wireless local area network may support an Institute of Electrical and Electronics Engineers (IEEE) standard 802.11. The method in FIG. 7 includes the following steps.

S701. The network device receives a first packet fragment set from the first user equipment.

Correspondingly, the first user equipment sends the first packet fragment set to the network device. The first packet fragment set includes a plurality of packet fragments.

For example, the network device may be located in an access network. The network device is not an edge device of the access network.

For example, the first packet fragment set may be an Ethernet frame fragment set. The Ethernet frame fragment set includes a plurality of Ethernet frame fragments. Optionally, the network device may be an OLT or a CMTS in a wired communications network or a base station, an access point, or the like in a wireless communications network. The first user equipment may be an ONU or a CM in a wired communications network or a mobile terminal, a station, or the like in a wireless communications network.

The first packet fragment set may include a plurality of packet fragments used to form a first packet. The first packet fragment set may be obtained by the first user equipment by slicing the first packet. When the network device receives the first packet fragment set, the first packet fragment set has not been reassembled into the first packet. For example, referring to FIG. 4, the first packet may be the packet P1, and the first packet fragment set may include P1_0 and P1_1. The foregoing packet fragment may be uplink data sent in a timeslot allocated to the first user equipment in a multi-user access protocol. It should be understood that the plurality of packet fragments included in the first packet fragment set may be sent to the server at the same time, or may not be sent to the server at the same time.

Optionally, a length of the first packet is greater than a maximum transmission unit (MTU) allocated to the first user equipment. The MTU refers to a size of a maximum data packet that can pass through a layer of a communications protocol. For example, the MTU may be a maximum transmission unit in an Ethernet Protocol.

Optionally, the length of the first packet is greater than a data length corresponding to the timeslot allocated to the first user equipment.

Optionally, the data length corresponding to the timeslot is a product of a data transmission rate of a link between the network device and first user equipment and a length of the timeslot. In an example, it is assumed that the foregoing data transmission rate is 50 megabits/second (Mbps), and a length of one timeslot is 10 microseconds ($\mu s$). The data length corresponding to the timeslot is 50 Mbps×10 $\mu s$=500 bits (bit).

S702. The network device sends the first packet fragment set to the server.

For example, the server may be located in the access network. The server may alternatively be located in a metropolitan area network. The server is an edge device of the access network. The server is an edge device of the metropolitan area network. For example, the server may be a data center.

Correspondingly, the server receives the first packet fragment set from the network device. The server reassembles the first packet fragment set, to generate the first packet. The first packet includes the first packet fragment set.

It should be noted that in S702, the first packet fragment set sent by the network device to the server has not been reassembled into the first packet, or is to be reassembled. After receiving the first packet fragment set, the server reassembles the first packet fragment set, to generate the first packet.

It may be learned that after obtaining the first packet, the first user equipment slices the first packet to obtain the first packet fragment set. The server obtains the first packet based on the first packet fragment set. Therefore, in this embodiment of this application, the process of obtaining the first packet based on the first packet fragment set is referred to as reassembly.

The foregoing server may be connected to the network device. For example, the foregoing server may be a cloud server. The foregoing server may store the first packet fragment set in a memory in the server, and reassemble the first packet fragment set.

In this embodiment of this application, the network device may send the first packet fragment set to the server, and the server reassembles the first packet fragment set. In the foregoing technical solution, when the first packet fragment set is reassembled, a storage resource of the network device does not need to be occupied. Therefore, occupancy of a storage resource of the network device is reduced. In this manner, an off-chip memory does not need to be configured for the network device to buffer to-be-reassembled packet fragments, so that costs of the network device can be reduced.

Optionally, after obtaining a reassembled packet, the server may continue to perform uplink transmission on the packet. For example, the reassembled packet includes a source destination address of the packet, and the server may send the packet to a destination address based on the source destination address. It should be noted that in a packet sending process, even if the source destination address of the reassembled packet is the same, the network device and the server may also send the reassembled packet to a corresponding destination address by using different forwarders.

Optionally, the method in FIG. 7 further includes: receiving, by the network device, a second packet fragment set from second user equipment, where the second packet fragment set includes a plurality of packet fragments; storing, by the network device, the second packet fragment set in an on-chip memory, where the on-chip memory and a processor of the network device are disposed on a same chip; and reassembling, by the network device, the second packet fragment set stored in the on-chip memory, to generate a second packet, where the second packet includes the second packet fragment set.

The first user equipment and the second user equipment may be different user equipments. For example, the network device may send packet fragment sets from some user equipments to the server to perform packet fragment reassembly, and locally store packet fragment sets from other user equipments to perform packet fragment reassembly. Packet fragment reassembly is collaboratively performed by using a storage resource in an on-chip memory in a local processor and a storage resource in the server, to improve flexibility of packet fragment reassembly.

In some examples, when a storage resource is available in the on-chip memory, packet fragment sets from some user equipments may be reassembled. For example, a second packet fragment set from the second user equipment is reassembled. When no storage resource is available in the on-chip memory, a received packet fragment set may be sent to the server to perform reassembly. For example, when a quantity of currently active users is less than a preset threshold, storage space of an on-chip memory is enough to store to-be-reassembled packet fragments; or when the quantity of currently active users is greater than the preset threshold, the storage space of the on-chip memory is not enough to store all to-be-reassembled packet fragments. Therefore, when there is a relatively large quantity of currently active users, packet fragment sets from some user equipments may be sent to the server to perform reassembly.

Alternatively, the first user equipment and the second user equipment may be same user equipment. For example, when no storage resource is available in the on-chip memory, the network device may send packet fragment sets of some user equipments to the server to perform packet fragment reassembly. After some storage resources in the on-chip memory are released, the network device may switch subsequent packet fragments of the user equipments back to locally perform packet fragment reassembly.

The on-chip memory and the processor are located in the same chip; and compared with an off-chip memory, the on-chip memory has a higher operating frequency, and is closer to the processor. Therefore, a packet fragment set is stored in the on-chip memory, and data reading and data processing can be implemented more quickly when packet fragment reassembly is performed, to reduce a delay of packet fragment reassembly.

In this embodiment of this application, a storage resource in the on-chip memory or the server may be allocated to a to-be-reassembled packet fragment set, to improve flexibility of packet fragment reassembly. Further, when a storage resource is available in the on-chip memory, packet reassembly may be preferentially completed locally, and a delay of packet fragment reassembly can be reduced.

In some examples, if a storage resource is available in the on-chip memory, a subsequent packet fragment set from the first user equipment may be switched to the network device to perform reassembly. In a switching process, a disorder of a packet fragment may occur, and consequently, a packet reassembly failure may be caused. For example, if a packet fragment P0_0 is reassembled on the server, and a packet fragment P0_1 is reassembled on the network device, because different packet fragments of a same packet are stored at different locations, a packet reassembly failure may be caused. To avoid the disorder of the packet fragment in a switching process, the network device needs to determine that after completing processing all historical packet fragments, the server locally reassembles a subsequent packet fragment.

Optionally, the method in FIG. 7 further includes: receiving, by the network device, a third packet fragment set from the first user equipment, where the third packet fragment set includes a plurality of packet fragments; receiving, by the network device, a fourth packet fragment set from the first user equipment, where the fourth packet fragment set includes a plurality of packet fragments; sending, by the network device, the fourth packet fragment set to the server, where the fourth packet fragment set is a packet fragment set preceding the third packet fragment set; and when the network device determines that the server has reassembled the fourth packet fragment set to generate a fourth packet, reassembling, by the network device, the third packet fragment set, to generate a third packet, where the third packet includes the third packet fragment set, and the fourth packet includes the fourth packet fragment set.

The server may reassemble a packet fragment set corresponding to the first user equipment based on a time at which a packet fragment is received. If the network device determines that the fourth packet fragment set has been reassembled and the fourth packet has been generated, it indicates that the server completes reassembling all packet fragment sets in front of the third packet fragment set. Therefore, the network device may locally reassemble the third packet fragment set without causing the disorder of the packet fragment. Alternatively, after determining that the server completes processing all packet fragment sets from the first user equipment, the network device switches to locally reassemble the subsequent packet fragment set from the first user equipment.

In some examples, that the network device determines that the server has reassembled the fourth packet fragment set from the first user equipment to generate a fourth packet includes: receiving, by the network device from the server, first information used to indicate the fourth packet; and determining, by the network device based on the first information, that the server has reassembled the fourth packet fragment set from the first user equipment to generate the fourth packet.

After completing packet fragment reassembly, the server may indicate, to the network device, information about a packet whose reassembly is completed. For example, the first information may include an identifier of the fourth packet. The foregoing identifier may be a sequence number of the fourth packet or other information used to indicate the fourth packet. The network device may determine, based on the first information, that the server has completed reassembling the fourth packet fragment set.

In a specific example, the network device may allocate a sequence number to a received packet fragment set based on receiving time. The foregoing sequence number can indicate a sending sequence of the packet formed by the packet fragment set. The sequence number may be, for example, the sequence number that is described above and that is allocated to the packet fragment. For example, if the first information used to indicate the received fourth packet that a sequence number of the fourth packet is 5, and the network device determines that a sequence number of a received to-be-reassembled third packet fragment set is 6, it indicates that the server has completed reassembling all the packet fragment sets in front of the third packet fragment set.

In other examples, after the sending, by the network device, the fourth packet fragment set to the server, the method further includes: storing, by the network device, the identifier of the fourth packet corresponding to the fourth packet fragment set; and the determining, by the network device based on the first information, that the server has reassembled the fourth packet fragment set to generate the fourth packet includes: determining, by the network device based on the stored identifier of the fourth packet and the first information, that the server has reassembled the fourth packet fragment set to generate the fourth packet.

In a specific example, the network device may locally record an identifier of a recently sent packet fragment set. After receiving the first information, the network device may compare the first information with locally recorded information. If the identifier of the recently sent packet fragment set is the same as an identifier indicated by the first information, the network device may determine that the server has completed reassembling all the packet fragment sets in front of the third packet fragment set. For example, if a sequence number of the recently sent packet fragment set that is locally recorded is 5, and the first information indicates that a sequence number of the fourth packet is 5, it indicates that the server has completed reassembling all the packet fragment sets from the first user equipment.

Optionally, the network device may allocate or manage a storage resource used for packet fragment reassembly. The network device may establish a communication mechanism with the server, and allocate and release the storage resource by communicating with the server.

In some examples, the method in FIG. 7 further includes: sending, by the network device, second information to the server, where the second information is used to request the server to allocate a storage resource that is used to reassemble a packet fragment set from the first user equipment into a packet.

For example, when the network device has released a storage resource that is of the first user equipment, that is located locally or in the server, and that is used for reassembly, or when the network device has not allocated a storage resource to the first user equipment, the network device may send the second information to the server, to request the server to allocate a corresponding storage resource to the first user equipment.

Optionally, the second information may also be separately sent with the first packet fragment set. Alternatively, the second information may be located in an encapsulation header of a packet fragment in the first packet fragment set. It should be noted that to increase utilization of a storage resource, the network device needs to send the second information to the server only when the server currently does not allocate the storage resource corresponding to the first user equipment. The storage resource may continue to be used for a subsequent packet fragment of the first user equipment, and therefore, a storage resource does not need to be requested for each packet fragment.

In some examples, the method in FIG. 7 further includes: sending, by the network device, third information to the server, where the third information is used to instruct the server to release a storage resource that is used to reassemble a packet fragment set from the first user equipment into a packet.

Optionally, the network device may be configured to manage aging mechanisms of a storage resource that is located locally and a storage resource that is in the server. For example, aging may be performed based on traffic statistics and time, to release, in a timely manner, a storage resource used for packet fragment reassembly. For example, when packet reassembly is performed by using an on-chip memory, if the user equipment has no uplink traffic in a specific time period, a storage resource of the user equipment in the on-chip memory may be released. Alternatively, when packet fragment reassembly is performed by using a storage resource in the server, if the network device determines that the user equipment has no uplink traffic in a specific time period, the network device may instruct the server to release the storage resource corresponding to the user equipment.

By using the foregoing storage resource management method, storage resources can be dynamically allocated and released to a plurality of user equipments, and an unused storage resource can be released in a timely manner, to increase utilization of a storage resource for packet fragment reassembly. In addition, in this dynamic storage resource management method, a storage resource required for reassembly can be provided for user equipment in a timely manner, to increase efficiency of packet fragment reassembly.

The foregoing describes the packet fragment processing method in the embodiments of this application in detail with reference to FIG. 1 to FIG. 7. The following continues to describe an apparatus according to the embodiments of this application with reference to the accompanying drawings.

Figure 8:
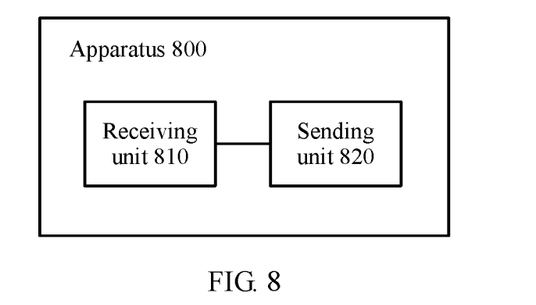
FIG. 8 is a schematic structural diagram of a packet fragment processing apparatus according to an embodiment of this application.

FIG. 8 is a schematic block diagram of a packet fragment processing apparatus 800 according to an embodiment of this application. It should be understood that the apparatus 800 can perform the steps that are in FIG. 1 to FIG. 7 and that are performed by the network device. To avoid repetition, details are not described herein again. The apparatus 800 includes: a receiving unit 810, configured to receive a first packet fragment set from first user equipment, where the first packet fragment set includes a plurality of packet fragments; and a sending unit 820, configured to send the first packet fragment set to a server.

Figure 9:
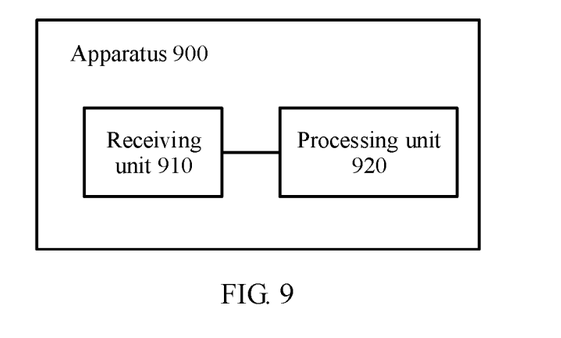
FIG. 9 is a schematic structural diagram of a packet fragment processing apparatus according to another embodiment of this application.

FIG. 9 is a schematic block diagram of a packet fragment processing apparatus 900 according to an embodiment of this application. It should be understood that the apparatus 900 can perform the steps that are in FIG. 1 to FIG. 7 and that are performed by the server. To avoid repetition, details are not described herein again. The apparatus 900 includes: a receiving unit 910, figured to receive a first packet fragment set from a network device, where the first packet fragment set includes a plurality of packet fragments, and the first packet fragment set is from first user equipment; and a processing unit 920, configured to reassemble the first packet fragment set, to generate a first packet, where the first packet includes the first packet fragment set.

Figure 10:
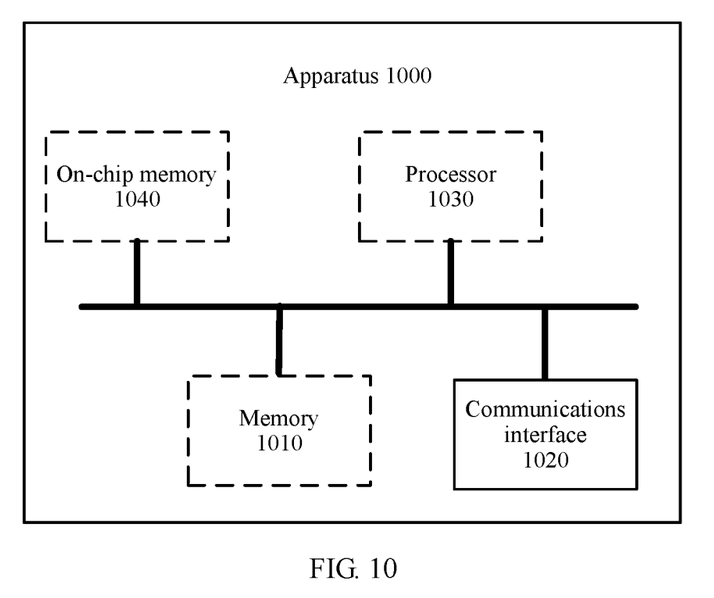
FIG. 10 is a schematic structural diagram of a packet fragment processing apparatus according to another embodiment of this application.

FIG. 10 is a schematic structural diagram of a packet fragment processing apparatus 1000 according to an embodiment of this application. The apparatus 1000 can perform the steps that are in FIG. 1 to FIG. 7 and that are performed by the network device. To avoid repetition, details are not described herein again. As shown in FIG. 10, the apparatus 1000 includes one or more communications interfaces 1020. The communications interface 1020 is configured to receive a first packet fragment set from first user equipment, where the first packet fragment set includes a plurality of packet fragments. The communications interface 1020 is further configured to send the first packet fragment set to a server. There may be one or more communications interface 1020. For example, the communications interface configured to receive the first packet fragment set from the first user equipment and the communications interface configured to send the first packet fragment set to the server may be a same communications interface, or may be different communications interfaces.

Optionally, the apparatus 1000 further includes one or more processors 1030 and one or more on-chip memories 1040; the on-chip memory and the processor are disposed on a same chip; the communications interface 1020 is further configured to receive a second packet fragment set from second user equipment, where the second packet fragment set includes a plurality of packet fragments; the processor 1030 is configured to store the second packet fragment set in the on-chip memory 1040; and the processor 1030 reassembles the second packet fragment set stored in the on-chip memory 1040, to generate a second packet, where the second packet includes the second packet fragment set.

Optionally, the communications interface 1020 is further configured to receive a third packet fragment set from the first user equipment, where the third packet fragment set includes a plurality of packet fragments; the communications interface 1020 is further configured to receive a fourth packet fragment set from the first user equipment, where the fourth packet fragment set includes a plurality of packet fragments; the communications interface 1020 is further configured to send the fourth packet fragment set to the server, where the fourth packet fragment set is a packet fragment set preceding the third packet fragment set; and when the processor 1030 determines that the server has reassembled the fourth packet fragment set to generate a fourth packet, the processor 1030 is configured to reassemble the third packet fragment set, to generate a third packet, where the third packet includes the third packet fragment set, and the fourth packet includes the fourth packet fragment set.

Optionally, the communications interface 1020 is further configured to receive, from the server, first information used to indicate the fourth packet; and when determining the server has reassembled the fourth packet fragment set to generate a fourth packet, the processor 1030 is specifically configured to determine, based on the first information, that the server has reassembled the fourth packet fragment set to generate the fourth packet.

Optionally, the apparatus 1000 further includes a memory 1010, and after the communications interface 1020 sends the fourth packet fragment set to the server, the memory 1010 is further configured to store an identifier of the fourth packet corresponding to the fourth packet fragment set; and the processor 1030 is specifically configured to determine, based on the stored identifier of the fourth packet and the first information, that the server has reassembled the fourth packet fragment set to generate the fourth packet.

The foregoing memory 1010 may be the on-chip memory 1040.

Alternatively, the foregoing memory 1010 and the on-chip memory 1040 are not a same memory. For example, the foregoing memory 1040 may alternatively be an off-chip memory, for example, a DDR storage.

Figure 11:
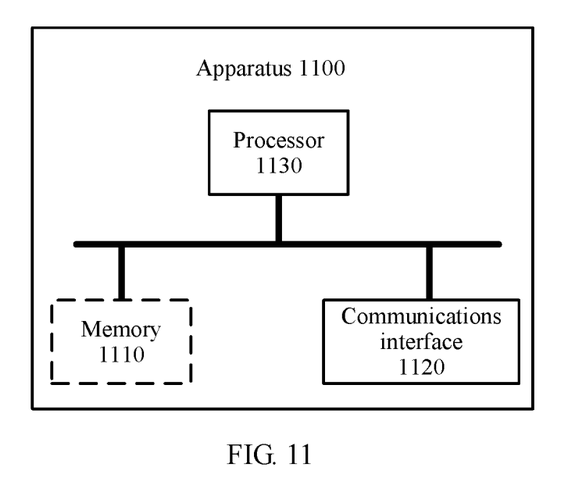
FIG. 11 is a schematic structural diagram of a packet fragment processing apparatus according to another embodiment of this application.

FIG. 11 is a schematic structural diagram of a packet fragment processing apparatus 1100 according to an embodiment of this application. The apparatus 1100 can perform the steps that are in FIG. 1 to FIG. 7 and that are performed by the server. To avoid repetition, details are not described herein again. As shown in FIG. 11, the apparatus 1100 includes one or more processors 1130 and one or more communications interfaces 1120. The communications interface 1020 is configured to receive a first packet fragment set from a network device, where the first packet fragment set includes a plurality of packet fragments, and the first packet fragment set is from first user equipment; and the processor 1030 is configured to reassemble the first packet fragment set, to generate a first packet, where the first packet includes the first packet fragment set.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the some embodiments provided in this application, it should be understood that the disclosed system, apparatus, and method may be implemented in other manners. For example, the described apparatus embodiments are merely examples. For example, the unit division is merely logical function division, and there may be another division manner during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, to be specific, may be located in one position, or may be distributed on a plurality of network units. Some or all of the units may be selected based on actual requirements to achieve the objectives of the solutions of the embodiments.

In addition, the functional units in the embodiments of this application may be integrated into one processing unit, or each of the units may exist alone physically, or two or more units may be integrated into one unit.

The technical solutions provided in this application may be implemented by using hardware. For example, the hardware may be at least one of a central processing unit (central processing unit, CPU), an application-specific integrated circuit (application-specific integrated circuit, ASIC), or a field programmable gate array (field programmable gate array, FPGA). In addition, the technical solutions provided in this application may be implemented by combining hardware and software. For example, the hardware may include a processor and a memory coupled to the processor. The software may include a computer instruction stored in the memory. The processor may execute the computer instruction by accessing the memory, to implement the technical solutions provided in this application. The foregoing software may be stored in a computer readable storage medium. This application provides a computer software product. The computer software product is stored in a storage medium, and includes some instructions for instructing a computer device (which may be a personal computer, a server, a network device, or the like) to perform all or some of the steps of the method described in the embodiments of this application. The foregoing storage medium includes: any medium that can store program code, such as a USB flash drive, a removable hard disk, a read-only memory (ROM), a random access memory (RAM), a magnetic disk, or a compact disc.

The foregoing descriptions are merely specific implementations of this application. A person skilled in the art may figure out a variation or replacement within the technical scope disclosed in this application and shall fall within the protection scope of this application.

What is claimed is:

1. A method, comprising:
   receiving, by a network device, a first packet fragment set from first user equipment, wherein the first packet fragment set comprises a plurality of packet fragments that are received fragmented from the first user equipment;
   prior to sending, by the network device, the first packet fragment set to a server, determining that a memory of the network device is unavailable for reassembling the first packet fragment set into the first packet; and
   sending, by the network device, the first packet fragment set to the server in response to the determining that the memory of the network device is unavailable for reassembling the first packet fragment set into the first packet.

2. The method according to claim 1, further comprising:
receiving, by the network device, a second packet fragment set from second user equipment, wherein the second packet fragment set comprises a plurality of packet fragments;
storing, by the network device, the second packet fragment set in an on-chip memory, where the on-chip memory and a processor of the network device are disposed on a same chip, wherein the memory comprises the on-chip memory; and
reassembling, by the network device, the second packet fragment set stored in the on-chip memory, to generate a second packet, where the second packet comprises the second packet fragment set.

3. The method according to claim 2, further comprising:
receiving, by the network device, a third packet fragment set from the first user equipment, wherein the third packet fragment set comprises a plurality of packet fragments;
receiving, by the network device, a fourth packet fragment set from the first user equipment, wherein the fourth packet fragment set comprises a plurality of packet fragments;
sending, by the network device, the fourth packet fragment set to the server, wherein the fourth packet fragment set is a packet fragment set preceding the third packet fragment set; and
when determining that the server has reassembled the fourth packet fragment set and generated the fourth packet, reassembling, by the network device, the third packet fragment set, to generate a third packet, where the third packet comprises the third packet fragment set, and the fourth packet comprises the fourth packet fragment set.

4. The method according to claim 3, where determining that the server has reassembled the fourth packet fragment set and generated the fourth packet comprises: receiving, by the network device from the server, first information used to indicate the fourth packet; and
determining, by the network device based on the first information, that the server has reassembled the fourth packet fragment set and generated the fourth packet.

5. The method according to claim 4, where after the sending, by the network device, the fourth packet fragment set to the server, the method further comprises:
storing, by the network device, an identifier of the fourth packet corresponding to the fourth packet fragment set; and
the determining, by the network device based on the first information, that the server has reassembled the fourth packet fragment set to generate the fourth packet comprises:
determining, by the network device based on the stored identifier of the fourth packet and the first information, that the server has reassembled the fourth packet fragment set and generated the fourth packet.

6. The method according to claim 1, where the server is a cloud server.

7. The method according to claim 1, where the network device is one of: an access point (AP), a headend device, an optical line terminal (OLT), a base station and a cable modem termination system (CMTS).

8. A method, comprising:
receiving, by a server, a first packet fragment set from a network device, where the first packet fragment set comprises a plurality of packet fragments that are received fragmented from first user equipment by the network device and sent by the network device to the server in response to the determining, by the network device, that a memory of the network device is unavailable for reassembling the first packet fragment set into a first packet, and the first packet fragment set is from first user equipment; and
reassembling, by the server, the first packet fragment set, to generate the first packet, wherein the first packet comprises the first packet fragment set.

9. The method according to claim 8, where the server is a cloud server.

10. An apparatus, comprising a communications interface, where the communications interface is configured to:
receive a first packet fragment set from first user equipment, wherein the first packet fragment set comprises a plurality of packet fragments that are received fragmented from the first user equipment;
prior to sending, by the network device, the first packet fragment set to a server, determine that a memory of the network device is unavailable for reassembling the first packet fragment set into the first packet; and
send the first packet fragment set to the server in response to the determining that the memory of the network device is unavailable for reassembling the first packet fragment set into the first packet.

11. The apparatus according to claim 10, further comprising a processor and an on-chip memory, where the on-chip memory and the processor are disposed on a same chip and the memory comprises the on-chip memory;
the communications interface is further configured to receive a second packet fragment set from second user equipment, where the second packet fragment set comprises a plurality of packet fragments;
the processor is configured to store the second packet fragment set in the on-chip memory; and
reassemble the second packet fragment set stored in the on-chip memory, to generate a second packet, where the second packet comprises the second packet fragment set.

12. The apparatus according to claim 11, where the communications interface is further configured to:
receive a third packet fragment set from the first user equipment, where the third packet fragment set comprises a plurality of packet fragments; receive a fourth packet fragment set from the first user equipment, wherein the fourth packet fragment set comprises a plurality of packet fragments; and send the fourth packet fragment set to the server, where the fourth packet fragment set is a packet fragment set preceding the third packet fragment set; and
when the processor determines that the server has reassembled the fourth packet fragment set to generate a fourth packet, the processor is configured to reassemble the third packet fragment set, to generate a third packet, where the third packet comprises the third packet fragment set, and the fourth packet comprises the fourth packet fragment set.

13. The apparatus according to claim 12, where the communications interface is further configured to receive, from the server, first information used to indicate the fourth packet; and when determining the server has reassembled the fourth packet fragment set to generate a fourth packet, the processor is specifically configured to determine, based on the first information, that the server has reassembled the fourth packet fragment set to generate the fourth packet.

14. The apparatus according to claim 13, where the apparatus further comprises a second memory; after the communications interface sends the fourth packet fragment set to the server, the second memory is further configured to store an identifier of the fourth packet corresponding to the fourth packet fragment set; and the processor is specifically configured to determine, based on the stored identifier of the fourth packet and the first information, that the server has reassembled the fourth packet fragment set to generate the fourth packet.

15. The apparatus according to claim 10, where the apparatus is one of: an access point (AP), a headend device, an optical line terminal (OLT), a base station and a cable modem termination system (CMTS).

16. An apparatus, comprising a processor and a communications interface, wherein
the communications interface is configured to receive a first packet fragment set from a network device, where the first packet fragment set comprises a plurality of packet fragments that are received fragmented from first user equipment, and the first packet fragment set is from the first user equipment by the network device and sent by the network device to the apparatus in response to the determining, by the network device, that a memory of the network device is unavailable for reassembling the first packet fragment set into a first packet; and
the processor is configured to reassemble the first packet fragment set, to generate the first packet, where the first packet comprises the first packet fragment set.

17. The apparatus according to claim 16, where the apparatus is a cloud server.

* * * * *